United States Patent
Yamashita

(10) Patent No.: US 9,411,720 B2
(45) Date of Patent: Aug. 9, 2016

(54) INFORMATION PROCESSING APPARATUS EQUIPPED WITH OVERWRITE DELETION FUNCTION, METHOD OF CONTROLLING THE SAME, AND STORAGE MEDIUM

(71) Applicant: CANON KABUSHIKI KAISHA, Tokyo (JP)

(72) Inventor: Takahiro Yamashita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 13/935,756

(22) Filed: Jul. 5, 2013

(65) Prior Publication Data

US 2014/0013040 A1     Jan. 9, 2014

(30) Foreign Application Priority Data

Jul. 5, 2012   (JP) ................................ 2012-151365

(51) Int. Cl.
    *G06F 12/00*        (2006.01)
    *G06F 12/02*        (2006.01)
    *G06F 9/44*          (2006.01)
    *G06F 3/06*          (2006.01)

(52) U.S. Cl.
    CPC .......... *G06F 12/0246* (2013.01); *G06F 9/4418* (2013.01); *G06F 3/067* (2013.01)

(58) Field of Classification Search
None
See application file for complete search history.

(56) References Cited

U.S. PATENT DOCUMENTS

| 7,327,484 B2 | 2/2008 | Yamashita et al. |
| 8,959,323 B2 * | 2/2015 | Ganti et al. ...................... 713/2 |
| 2009/0144557 A1 * | 6/2009 | Sutton ............................ 713/189 |
| 2010/0274986 A1 | 10/2010 | Matsumoto |

FOREIGN PATENT DOCUMENTS

| CN | 1671168 A | 9/2005 |
| CN | 101872289 A | 10/2010 |
| JP | H03171242 A | 7/1991 |
| JP | 2001125659 A | 5/2001 |
| JP | 2002207537 A | 7/2002 |
| JP | 2007172183 A | 7/2007 |
| JP | 2008269024 A | 11/2008 |
| JP | 2011-005683 A | 1/2011 |
| WO | 2011130934 A1 | 10/2011 |

OTHER PUBLICATIONS

Korean Office Action issued in Korean counterpart application No. KR10-2013-0074782, dated Aug. 20, 2015.
Office Action issued in Chinese Appln. No. 201310274661.9 dated May 27, 2015. English translation provided.

* cited by examiner

*Primary Examiner* — Brian Peugh
(74) *Attorney, Agent, or Firm* — Rossi, Kimms & McDowell LLP

(57) ABSTRACT

An information processing apparatus which is capable of effectively using an overwrite deletion function and a hibernation function. An image forming apparatus as the information processing apparatus that is equipped with an overwrite deletion function for overwriting data stored in a HDD, and a hibernation function for causing data stored in a RAM to be stored in the HDD. In a case where one of the overwrite deletion function and the hibernation function is enabled, a CPU disables the other function.

9 Claims, 10 Drawing Sheets

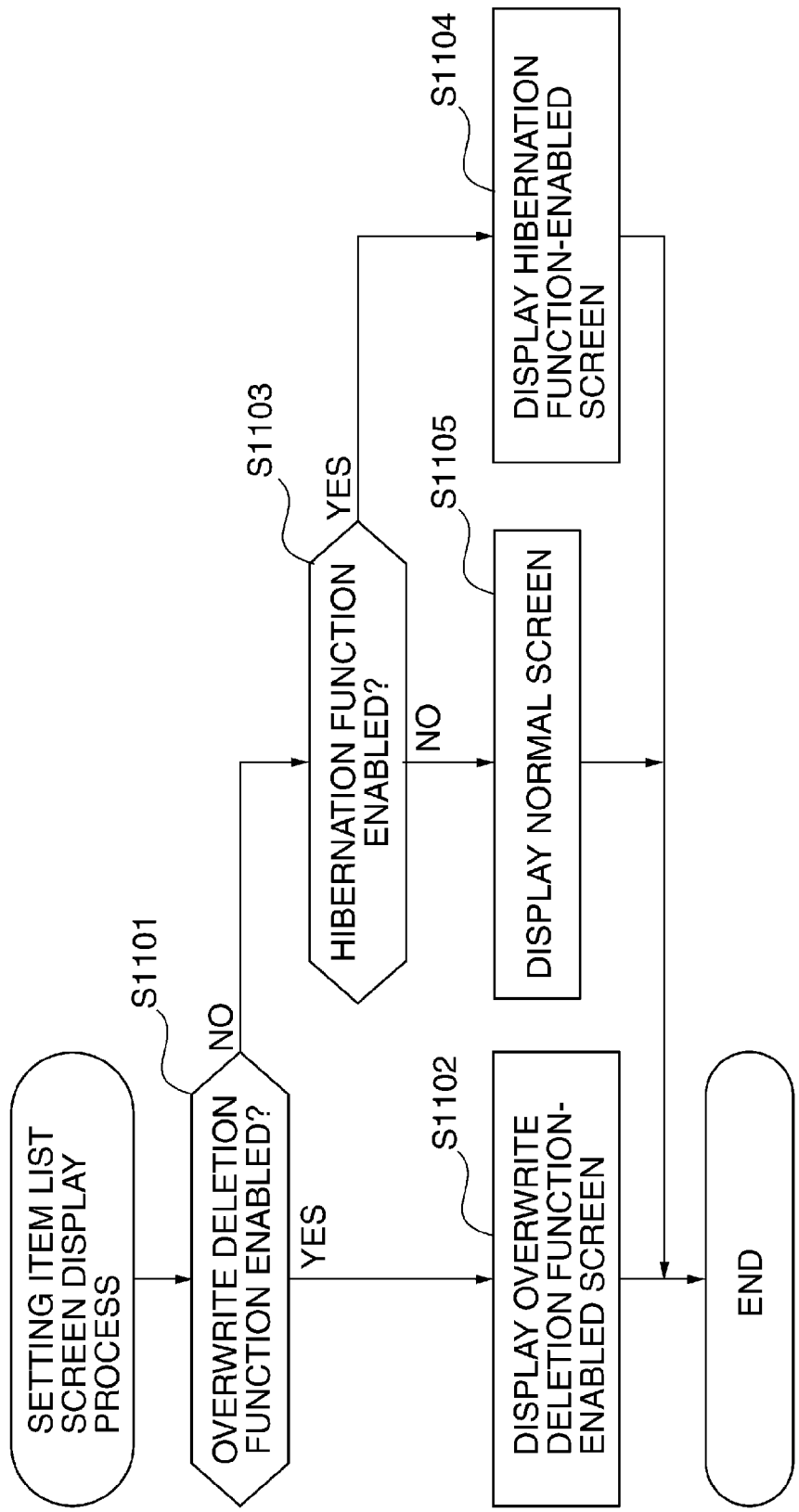

INFORMATION PROCESSING APPARATUS EQUIPPED WITH OVERWRITE DELETION FUNCTION, METHOD OF CONTROLLING THE SAME, AND STORAGE MEDIUM

BACKGROUND OF THE INVENTION

1. Field of the Invention

The present invention relates to an information processing apparatus equipped with an overwrite deletion function, a method of controlling the same, and a storage medium.

2. Description of the Related Art

Conventionally, there has been known an information processing apparatus that is capable of accumulating information using an external storage device, such as a hard disk drive (hereinafter referred to as the "HDD"). The HDD stores data and position information indicative of locations of the data in the HDD (hereinafter referred to as the "FAT (file allocation table)").

Further, some information processing apparatuses of this type temporarily store received information (hereinafter referred to as "data"), and delete the data from the HDD after completion of processing (hereinafter referred to as a "job").

If the HDD is removed from the information processing apparatus in a state where the data is stored in the HDD before being deleted therefrom and is connected to another computer for analyzing the interior of the HDD, there is a danger that the data is stolen from the HDD.

As the awareness of such danger and information security increases, an overwrite deletion function for deleting not only a FAT but also remaining data has come to be widely known.

In an information processing apparatus having the overwrite deletion function, it is guaranteed that there is no remaining data, by writing 0's, random numbers, or fixed values, over used data once or a plurality of times simultaneously with completion of a job.

On the other hand, a technique of hibernation has been proposed which restores the status of a system by storing, in the HDD, system information stored in a volatile area (hereinafter referred to as the "RAM"), reading out the system information from the HDD during the next startup of the system, and writing back the system information in the RAM.

The hibernation is widely known as a technique for restoring the system from a power-off state thereof at a high speed by combining techniques for compressing and reducing the system information. Note that there is a possibility that the system information stored in the HDD during a hibernation period includes information, such as user information and its cache information, which should be deleted by the overwrite deletion function.

Based on the above-described background, a technique has been disclosed which saves secret information from the HDD to a memory before the system shifts to a power saving state, and what is more, causes the secret information stored in the HDD to be overwritten and deleted (see e.g. Japanese Patent Laid-Open Publication No. 2011-005683). This is a technique for simultaneously realizing prevention of leakage of the secret information from the HDD e.g. removed in the power saving state for analysis and holding of the secret information in the memory without any loss thereof.

However, when the overwrite deletion function and the hibernation function are used in combination, the power of the system is sometimes turned off while data to be deleted by the overwrite deletion function is included in the system information. The system information is provided for performing the next startup of the system at a high speed, and when user information is determined and deleted from the system information, it takes extra time to perform a termination process since the determination and deletion of the user information are performed.

SUMMARY OF THE INVENTION

The present invention provides an information processing apparatus that is capable of effectively using an overwrite deletion function and a hibernation function, a method of controlling the information processing apparatus, and a storage medium.

In a first aspect of the present invention, there is provided an information processing apparatus that is equipped with an overwrite deletion function for overwriting data stored in a nonvolatile memory device, and a hibernation function for causing data stored in a volatile memory device to be stored in the nonvolatile memory device, comprising a control unit configured to, in a case where one of the overwrite deletion function and the hibernation function is enabled, disable the other function.

In a second aspect of the present invention, there is provided a method of controlling an information processing apparatus that is equipped with an overwrite deletion function for overwriting data stored in a nonvolatile memory device, and a hibernation function for causing data stored in a volatile memory device to be stored in the nonvolatile memory device, comprising disabling, in a case where one of the overwrite deletion function and the hibernation function is enabled, the other function.

In a third aspect of the present invention, there is provided a non-transitory computer-readable storage medium storing a computer-executable program for causing a computer to execute a method of controlling an information processing apparatus that is equipped with an overwrite deletion function for overwriting data stored in a nonvolatile memory device, and a hibernation function for causing data stored in a volatile memory device to be stored in the nonvolatile memory device, wherein the method comprises disabling, in a case where one of the overwrite deletion function and the hibernation function is enabled, the other function.

According to the present invention, the information processing apparatus becomes capable of effectively using the overwrite deletion function and the hibernation function.

Further features of the present invention will become apparent from the following description of exemplary embodiments with reference to the attached drawings.

BRIEF DESCRIPTION OF THE DRAWINGS

FIG. 12 is a flowchart of a setting item list screen display process executed by the CPU of the image forming apparatus.

DESCRIPTION OF THE EMBODIMENTS

The present invention will now be described in detail below with reference to the accompanying drawings showing embodiments thereof. In the present embodiment, a description will be given of a case where an information processing apparatus according to the present invention is applied to an image forming apparatus.

Figure 1:
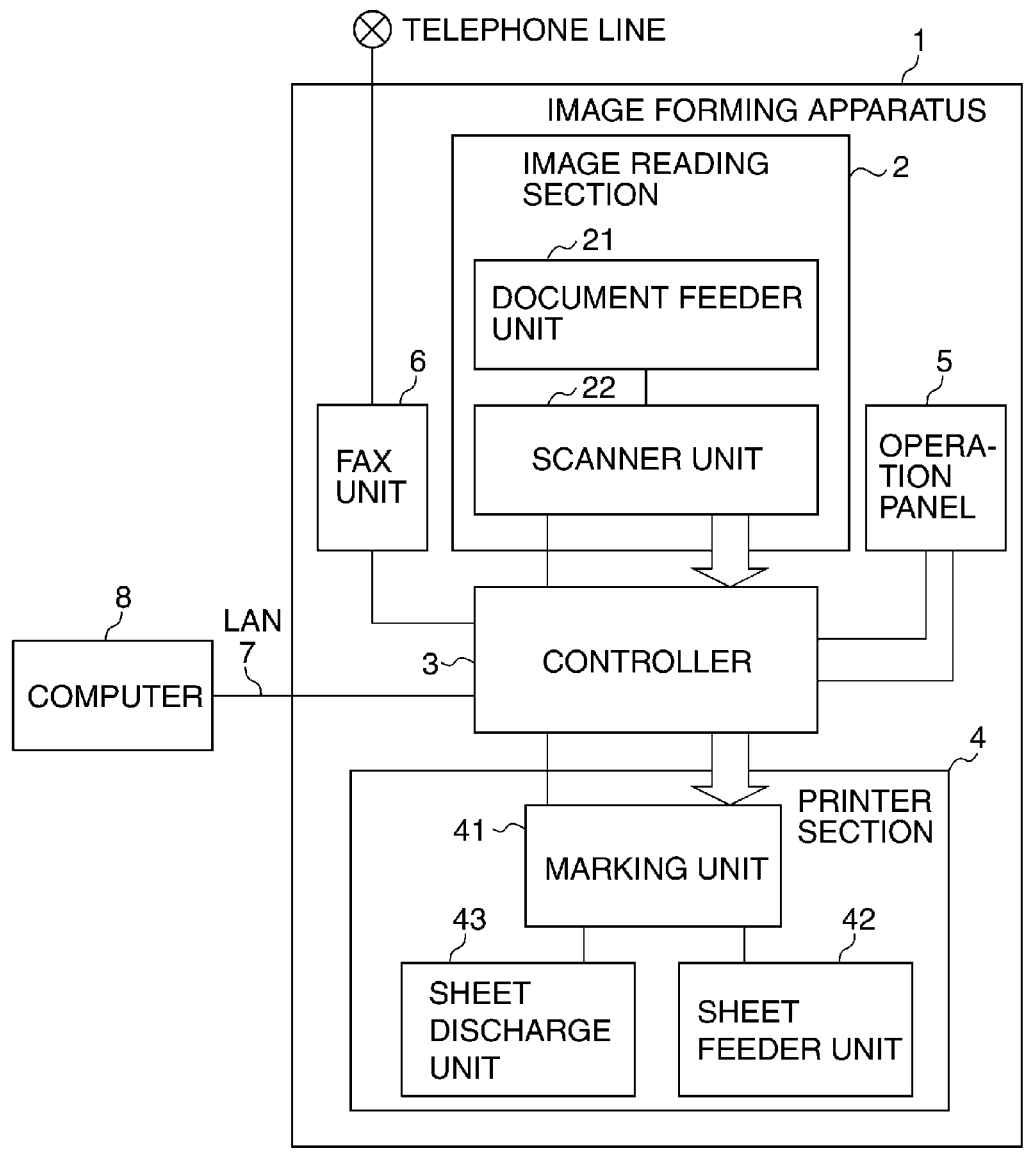
FIG. 1 is a schematic view of an image forming apparatus as an information processing apparatus according to a first embodiment of the present invention.

FIG. 1 is a schematic view of the image forming apparatus 1 according to the embodiment of the present invention.

Referring to FIG. 1, the image forming apparatus 1 comprises a controller 3, an image reading section 2, a printer section 4, an operation panel 5, and a FAX unit 6.

The controller 3 controls the overall operation of the image forming apparatus 1. The image reading section 2 optically reads an image from an original, and converts the read image to image data. Further, the image reading section 2 includes a document feeder unit 21 and a scanner unit 22.

The document feeder unit 21 is capable of sequentially automatically feeding from original bundles in an interchangeable manner. Further, the scanner unit 22 is capable of optically scanning an original and converting the scanned original to image data. The converted image data is transmitted to the controller 3.

The printer section 4 prints an image represented by image data on a recording sheet. Further, the printer section 4 includes a marking unit 41, a sheet discharge unit 43, and a sheet feeder unit 42. The sheet feeder unit 42 is capable of feeding sheets one by one from a sheet bundle. The marking unit 41 prints an image on each fed sheet. The sheet discharge unit 43 discharges each printed sheet.

The FAX unit 6 performs transmission and reception of image data using a telephone line. The operation panel 5 displays information to a user, and receives a user's operation.

Further, the image forming apparatus 1 is capable of transmitting and receiving image data to and from a computer 8 using a LAN (local area network) 7. The computer 8 is capable of issuing jobs and providing instructions to the image forming apparatus 1 using the LAN 7.

The image forming apparatus 1 can execute various jobs. Next, a copy function, an image transmission function, an image storage function, and an image printing function will be described, by way of example.

First, the copy function is a function of storing image data obtained by the image reading section 2 in a nonvolatile memory device (HDD 102 in the present embodiment) of the controller 3, and simultaneously printing the image data using the printer section 4. The image transmission function is a function of transmitting the image data obtained by the image reading section 2 to the computer 8 using the LAN 7.

The image storage function is a function of storing the image data obtained by the image reading section 2 in the nonvolatile memory of the controller 3, and transmits or prints the image data as required. The image printing function is a function of analyzing e.g. page description language (PDL) data transmitted from the computer 8, and prints the same using the printer section 4.

Figure 2:
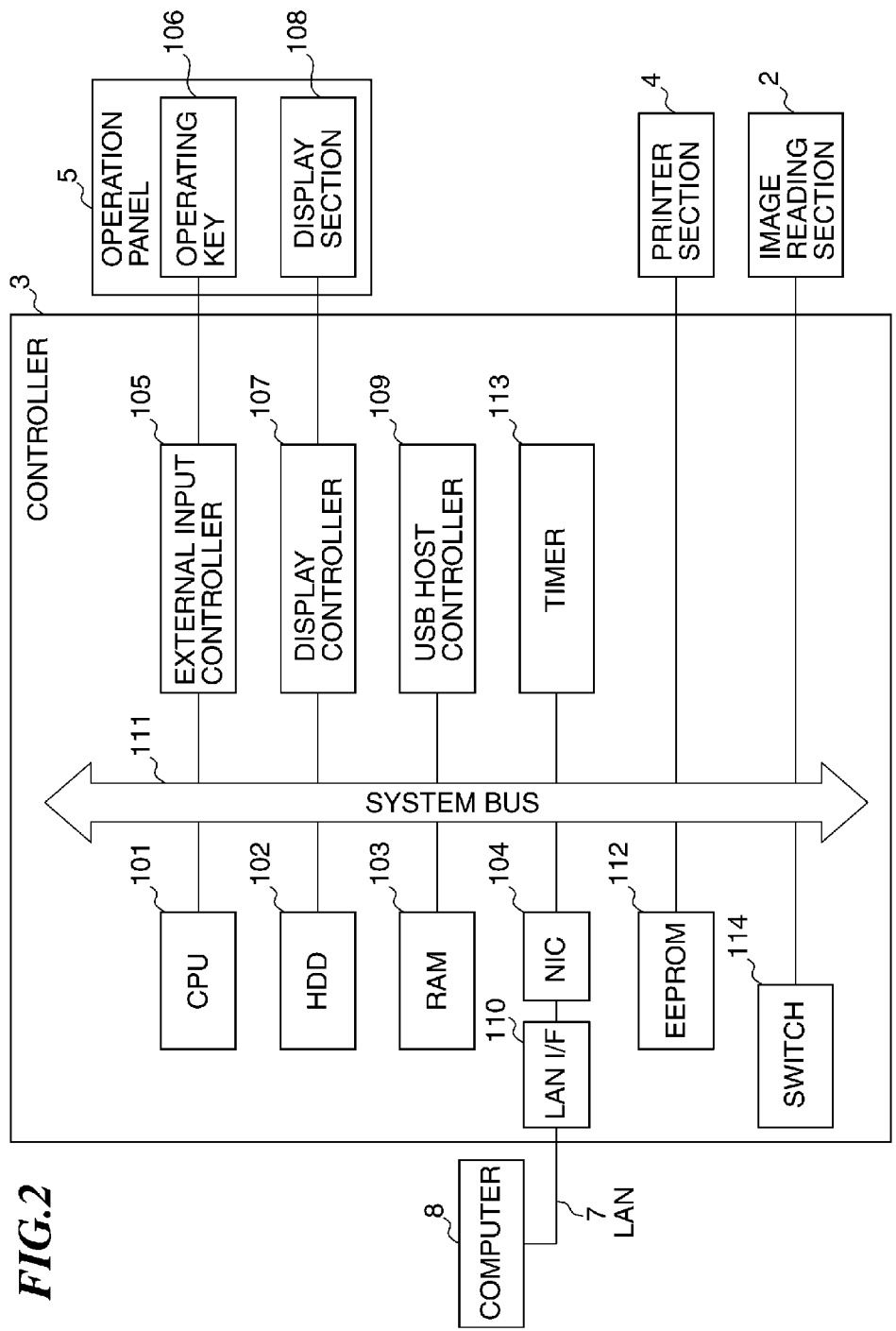
FIG. 2 is a schematic view of a controller shown in FIG. 1.

FIG. 2 is a schematic view of the controller 3 shown in FIG. 1.

Referring to FIG. 2, the controller 3 comprises a CPU 101, the aforementioned HDD (hard disk drive) 102, a RAM 103, an NIC 104, a LAN interface 110, an EEPROM (electrically erasable programmable ROM) 112, a switch 114, an external input controller 105, a display controller 107, a USB host controller 109, and a timer 113.

The CPU 101 performs the centralized control of devices connected to a system bus 111 according to a given command set and input values. The HDD 102 is a nonvolatile memory device for storing data e.g. of an operating system, a boot loader for selecting an operating system, firmware for implementing and controlling various functions, and a file system for efficiently managing files of data.

The RAM 103 is a volatile memory device, and is used as a main memory or a work area of the CPU 101. The NIC 104 is a network interface card, and connects a LAN cable to the LAN interface 110, for bi-directionally transmitting and receiving data to and from other network devices, such as the computer 8, using the LAN 7.

The operation panel 5 corresponds to an input unit, and is provided with a touch panel, not shown, for a user to input instructions, an operating key 106, and a display section 108 as a display unit for displaying information, such as system information, to the user.

The external input controller 105 detects and controls instructions input from the touch panel or the operating key 106. The display controller 107 controls display on the display section 108.

The USB host controller 109 enables a large-capacity storage device and a device including a USB interface, such as an IC card reader, to connect to the controller 3. The EEPROM 112 is a rewritable small-capacity nonvolatile memory, and stores e.g. setting information of the image forming apparatus 1.

The timer 113 is provided with a secondary battery, and not only always measures a time period having elapsed after a reference time point but also measures the lapse of time in response to an instruction from the CPU 101.

The switch 114 is capable of generating a power control instruction to the CPU 101. The CPU 101 performs a startup process, a shutdown process, and a power state-shifting process for shifting e.g. to a power saving state, described hereinafter, according to the power control instruction.

The image forming apparatus 1 can be shifted to the power saving state where power consumption is relatively low, other than a normal state where the sections thereof are energized. When a request for shifting the image forming apparatus 1 to the power saving state has been received, the CPU 101 restricts energization of the sections other than the RAM 103, the operation panel 5, and the switch 114, sifts the image forming apparatus 1 to the power saving state where the power consumption is suppressed, and sets the CPU 101 itself to a state capable of receiving only a request for shifting the image forming apparatus 1 to the normal state.

Note that at this time, to make it possible to shift the image forming apparatus 1 to the normal state according to a print request from the LAN 7, the NIC 104 and the LAN interface 110 as external interfaces may be held energized.

Further, when the request for shifting the image forming apparatus 1 to the normal state has been received, the CPU 101 shifts the image forming apparatus 1 from the power saving state to the normal state by energizing the sections that have not been energized and performing initialization thereof. The request for shifting the image forming apparatus 1 to the power saving state and the request for shifting the image forming apparatus 1 to the normal state can be generated by operating the switch 114 or the operating key 106.

Next, a description will be given of an overwrite deletion process and a hibernation data creation process which are executed by the controller 3 configured as described above.

The overwrite deletion process for implementing an overwrite deletion function refers to a process in which in deleting data stored in the HDD 102 according an instruction from the CPU 101, predetermined data is written in an area storing the data to thereby overwrite the data stored in the area. Specifically, the overwrite deletion process refers to a process for eliminating residual magnetic data stored in the HDD 102 by overwriting the data with e.g. data formed of only 0's or data formed of random numbers, a plurality of times.

Further, the hibernation data creation process for implementing a hibernation data creation function refers to a process for causing data stored in the RAM 103 to be stored in the HDD 102. Specifically, the hibernation data creation process refers to a process in which the CPU 101 reads out system information stored in the RAM 103, and causes the read system information to be stored in the HDD 102 as hibernation data.

The CPU 101 checks during the next restart of the image forming apparatus 1 whether or not hibernation data is stored in the HDD 102, and when hibernation data is stored, the CPU 101 loads the hibernation data into the RAM 103 to thereby restore the state of the image forming apparatus 1.

Figure 3:
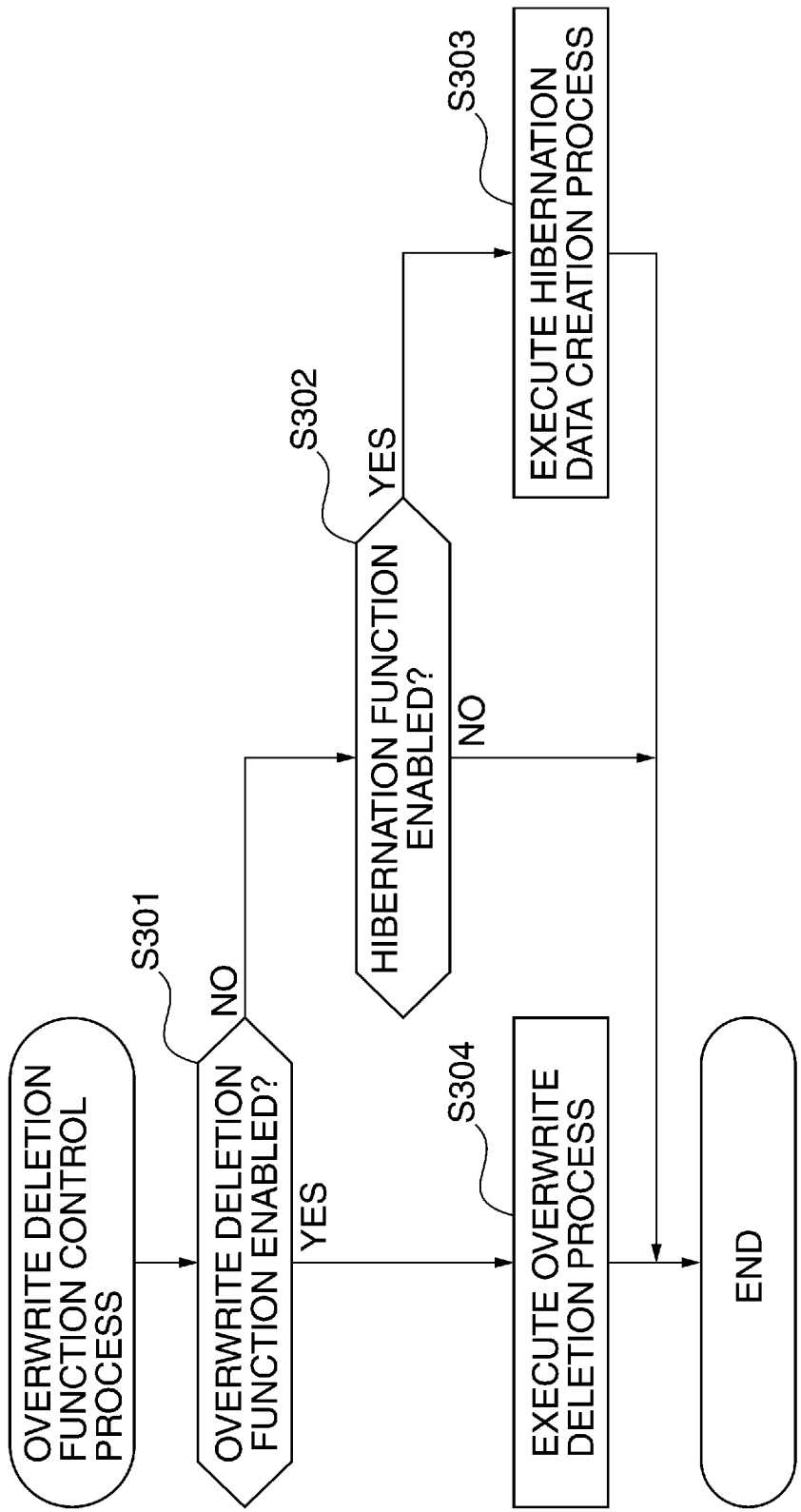
FIG. 3 is a flowchart of an overwrite deletion function control process executed by a CPU shown in FIG. 2.

FIG. 3 is a flowchart of an overwrite deletion function control process executed by the CPU 101 shown in FIG. 2.

In the present embodiment, the overwrite deletion function control process shown in FIG. 3 is executed when the HDD 102 is not accessed for a predetermined time period, when a startup process of the image forming apparatus 1 is performed, or before the power state is shifted upon receipt of a user's request for shifting the image forming apparatus 1 to the power saving state. However, execution of the overwrite deletion function control process is not limited to these cases.

Referring to FIG. 3, the CPU 101 determines whether or not the overwrite deletion function has been enabled (step S301). This determination is performed using setting information stored in one of the HDD 102, the RAM 103, and the EEPROM 112, which indicates whether or not the overwrite deletion function has been enabled. The setting information also indicates whether or not the hibernation function has been enabled.

If it is determined in the step S301 that the overwrite deletion function has been enabled (YES to the step S301), the above-mentioned overwrite deletion process is performed (step S304), followed by terminating the present process.

On the other hand, if it is determined in the step S301 that the overwrite deletion function has not been enabled (NO to the step S301), it is determined whether or not the hibernation function has been enabled (step S302).

If it is determined in the step S302 that the hibernation function has not been enabled (NO to the step S302), the present process is terminated, whereas if it is determined in the step S302 that the hibernation function has been enabled (YES to the step S302), the hibernation data creation process is performed (step S303), followed by terminating the present process.

According to the FIG. 3 process, it is possible to inhibit creation of hibernation data which can include information to be deleted by overwriting, when the overwrite deletion function is enabled. As described above, when the overwrite deletion function is set to be enabled and the hibernation function is set to be disabled, the power consumption of the information processing apparatus is reduced without using the hibernation function. This makes it possible to maintain high-speed performance of the information processing apparatus at the startup by thus shifting the same to the power saving state.

Figure 4:
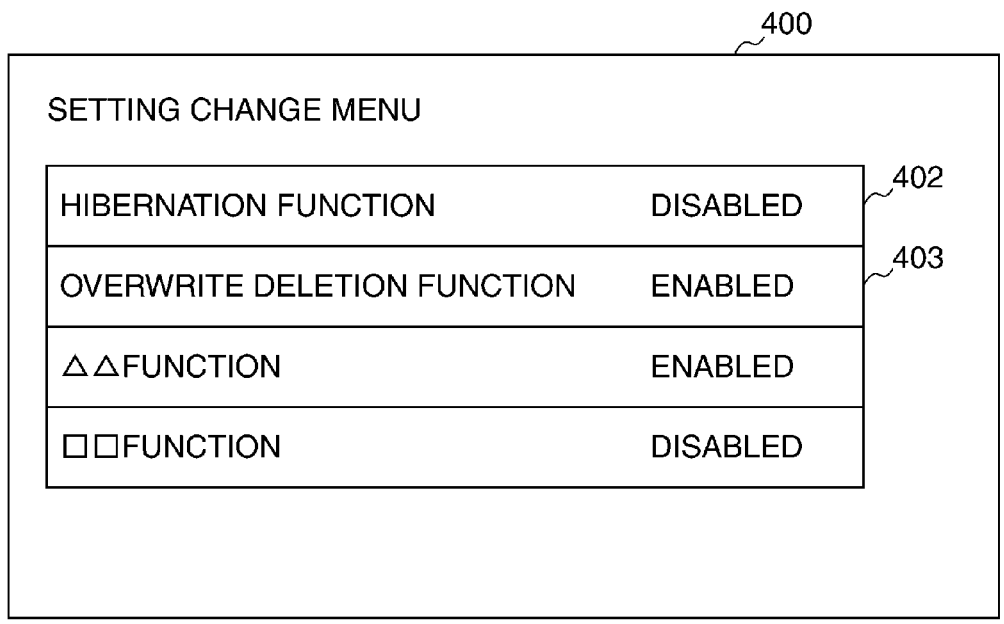
FIG. 4 is a view of a setting item list screen displayed on a display section shown in FIG. 2.

FIG. 4 is a view of a setting item list screen 400 displayed on the display section 108 shown in FIG. 2.

Referring to FIG. 4, the setting item list screen 400 shows buttons 402 and 403, which display function names and setting information associated with setting items, and so forth. When one of the buttons is depressed by the user, a setting screen associated therewith is displayed.

For example, when the button 402 is depressed, a hibernation function-setting screen is displayed, and when the button 403 is depressed, an overwrite deletion function-setting screen is displayed. When the hibernation function or the overwrite deletion function is set by the user on an associated one of the setting screens, associated setting information is updated.

Figure 5:
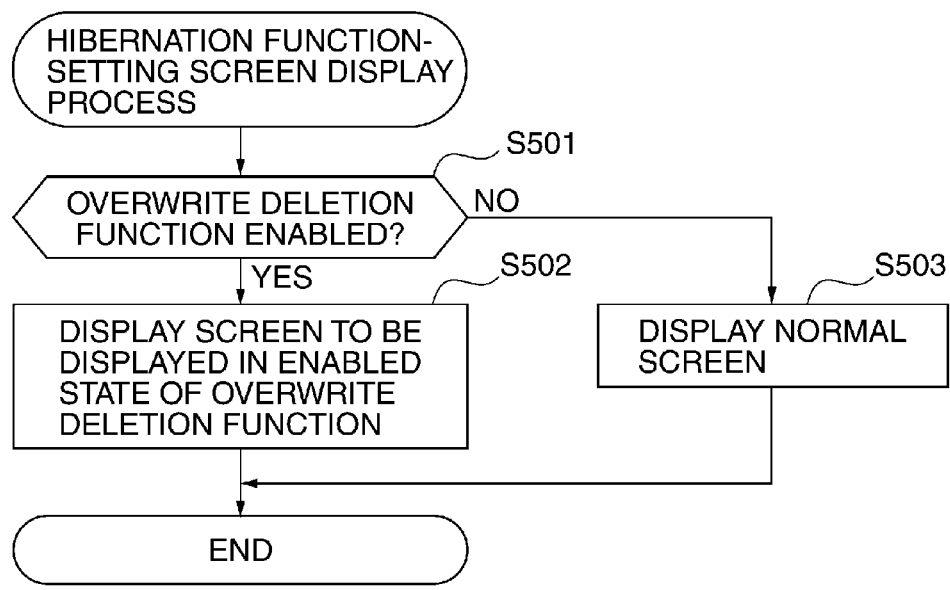
FIG. 5 is a flowchart of a hibernation function-setting screen display process executed by the CPU shown in FIG. 2.

FIG. 5 is a flowchart of a hibernation function-setting screen display process executed by the CPU 101 appearing in FIG. 2.

The hibernation function and the overwrite deletion function are set in a mutually exclusive manner, and hence, when the hibernation function is to be enabled, a different setting screen is displayed depending on whether or not the overwrite deletion function has been enabled.

Referring to FIG. 5, when the button 402 appearing in FIG. 4 is depressed by the user, a request for shifting the screen to a hibernation function-setting screen is detected, and it is determined whether or not the overwrite deletion function has been enabled (step S501).

When it is determined in the step S501 that the overwrite deletion function has been enabled (YES to the step S501), a screen to be displayed in the enabled state of the overwrite deletion function is displayed (step S502), followed by terminating the present process.

On the other hand, when it is determined in the step S501 that the overwrite deletion function has not been enabled (NO to the step S501), a normal screen to be displayed when the overwrite deletion function has not been enabled is displayed (step S503), followed by terminating the present process.

Figure 6A:
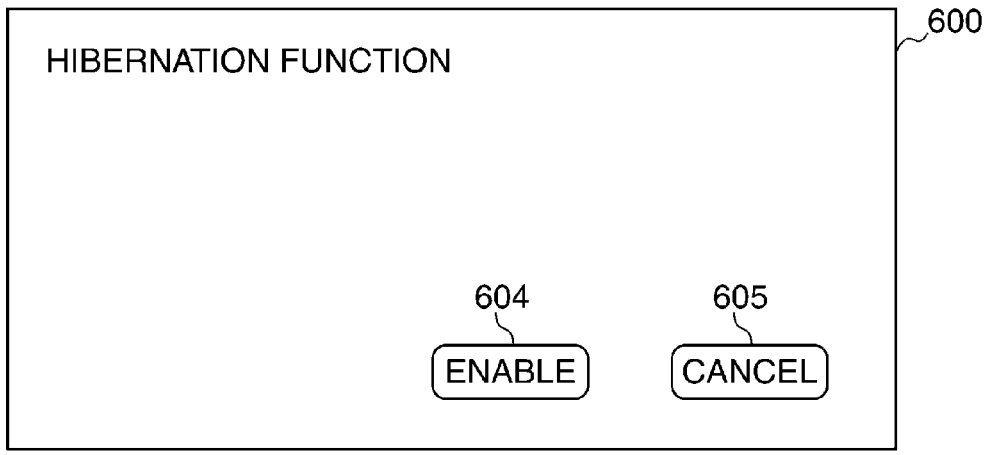
FIGS. 6A to 6C are views of screens displayed in the FIG. 5 hibernation function-setting screen display process.
Figure 6B:
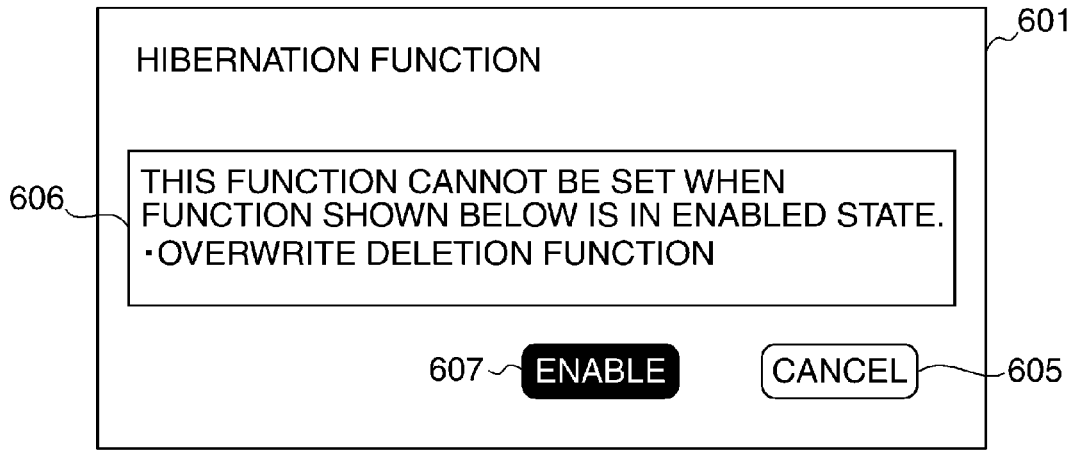
Figure 6C:
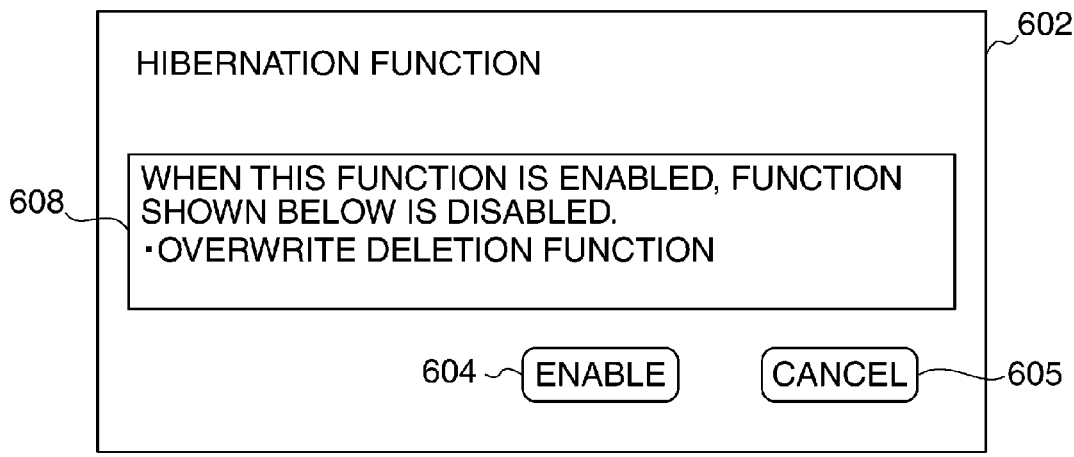

FIGS. 6A to 6C are views of screens displayed in the FIG. 5 hibernation function-setting screen display process.

FIG. 6A shows a screen 600 displayed when the overwrite deletion function is disabled and at the same time the hibernation function is disabled.

The screen 600 displays an enable button 604, and a cancel button 605. When the enable button 604 is depressed by the user, the hibernation function is enabled. This also applies to an enable button 604 shown on a screen 602, referred to hereinafter.

When the cancel button 605 is depressed by the user, nothing is set. This also applies to a cancel button 605 shown on screens 601 and 602, referred to hereinafter.

On the other hand, FIGS. 6B and 6C show the screens 601 and 602 displayed when the overwrite deletion function is enabled and at the same time the hibernation function is disabled.

FIG. 6B further displays a warning message 606. Further, an enable button 607 is displayed in a color different from the color of the enable button 604.

The screen 601 is displayed on the image forming apparatus 1 that cannot set the hibernation function unless the overwrite deletion function is disabled.

The warning message 606 notifies the user that the hibernation function cannot be enabled in the enabled state of the overwrite deletion function. Further, to indicate for the user that the hibernation function cannot be set to be enabled, the enable button 607 is displayed in a color different from the color of the enable button 604 (greyed out, for example). Therefore, even if the user operates the enable button 607, a request for enabling the hibernation function is not notified.

Note that the enable button 607 may be changed not only in color but also in form. Further, the enable button 607 is not required to be displayed.

In FIG. 6C, a warning message 608 is displayed.

The screen 602 is displayed on the image forming apparatus 1 that disables the overwrite deletion function when the hibernation function is set i.e. enabled.

Therefore, the warning message 608 notifies the user that the overwrite deletion function is disabled, if the hibernation function is enabled in the enabled state of the overwrite deletion function.

Figure 7:
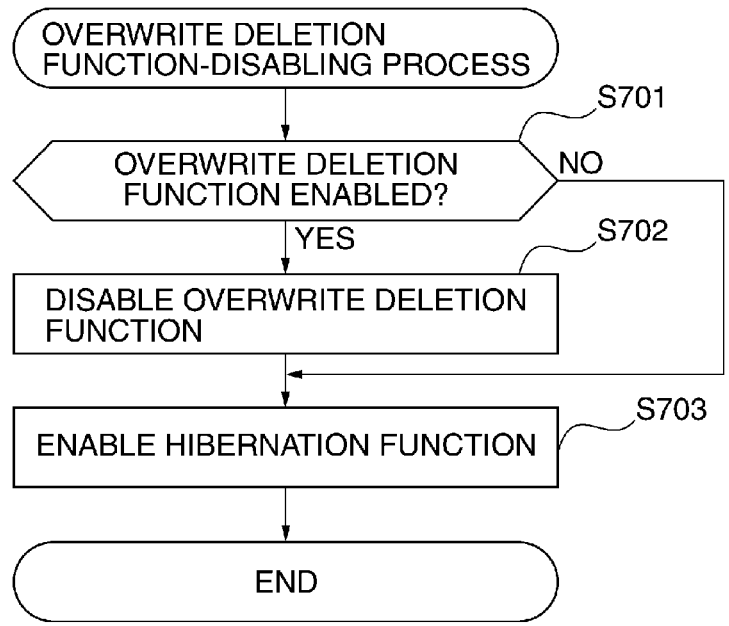
FIG. 7 is a flowchart of an overwrite deletion function-disabling process executed by the CPU shown in FIG. 2.

FIG. 7 is a flowchart of an overwrite deletion function-disabling process executed by the CPU 101 shown in FIG. 2.

The process shown in FIG. 7 is executed in response to the request for enabling the hibernation function, which is issued when the hibernation function is set by the user.

First, it is determined whether or not the overwrite deletion function has been enabled (step S701). If it is determined in the step S701 that the overwrite deletion function has not been enabled (NO to the step S701), the hibernation function is enabled (step S703), followed by terminating the present process.

On the other hand, if it is determined in the step S701 that the overwrite deletion function has been enabled (YES to the step S701), the overwrite deletion function is disabled (step S702), and the CPU 101 proceeds to the above-described step S703.

Thus, the hibernation function is enabled. In a case where the hibernation function is set to be enabled as described above and the image forming apparatus 1 is restarted using data stored in the HDD 102 by the hibernation function, the data stored in the HDD 102 by the hibernation function may be deleted by the overwrite deletion function.

Figure 8:
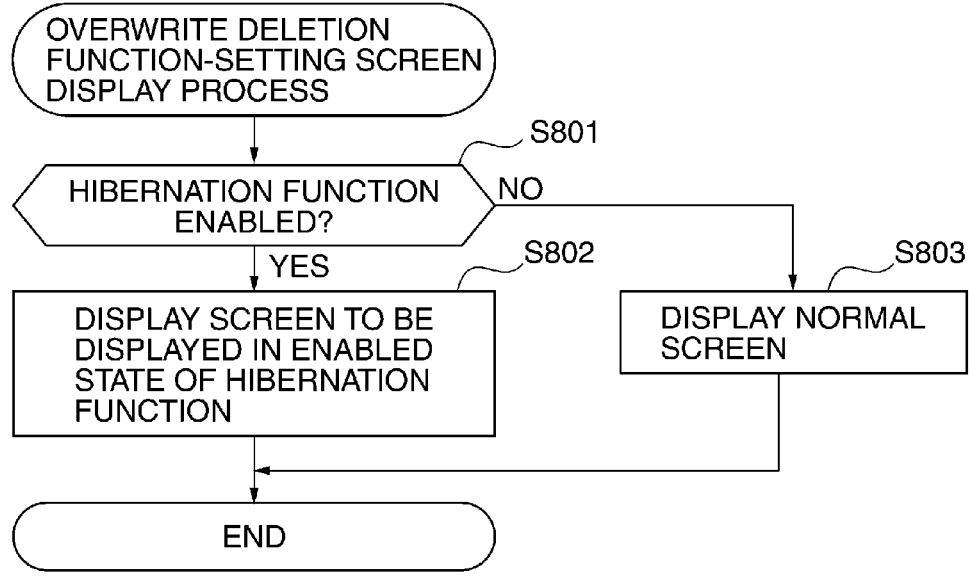
FIG. 8 is a flowchart of an overwrite deletion function-setting screen display process executed by the CPU shown in FIG. 2.

FIG. 8 is a flowchart of an overwrite deletion function-setting screen display process executed by the CPU 101 appearing in FIG. 2.

As described hereinbefore, the hibernation function and the overwrite deletion function are set in a mutually exclusive manner, and hence when the overwrite deletion function is to be enabled, a different setting screen is displayed depending on whether or not the hibernation function is enabled.

Referring to FIG. 8, when the button 403 appearing in FIG. 4 is depressed by the user, a request for shifting the screen to an overwrite deletion function-setting screen is detected, and it is determined whether or not the hibernation function has been enabled (step S801).

When it is determined in the step S801 that the hibernation function has been enabled (YES to the step S801), a screen to be displayed in the enabled state of the hibernation function is displayed (step S802), followed by terminating the present process.

On the other hand, when it is determined in the step S801 that the hibernation function has not been enabled (NO to the step S801), a normal screen to be displayed in the disabled state of the hibernation function is displayed (step S803), followed by terminating the present process.

Figure 9A:
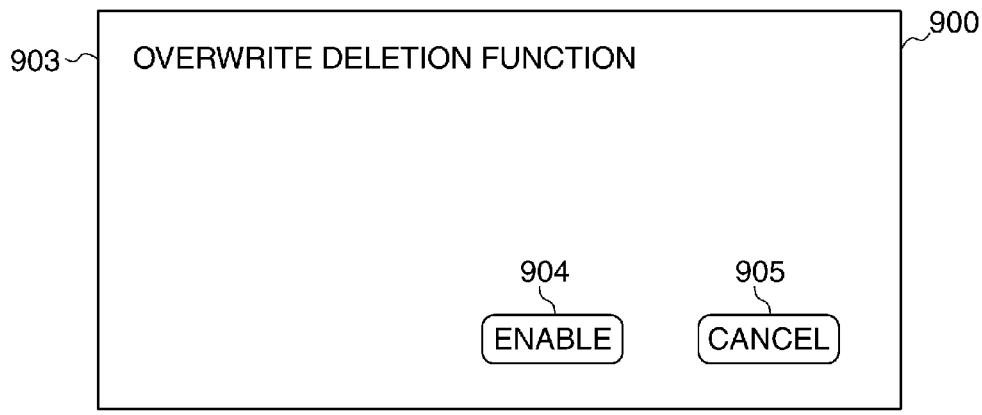
FIGS. 9A to 9C are views of screens displayed in the overwrite deletion function-setting screen display process in FIG. 8.
Figure 9B:
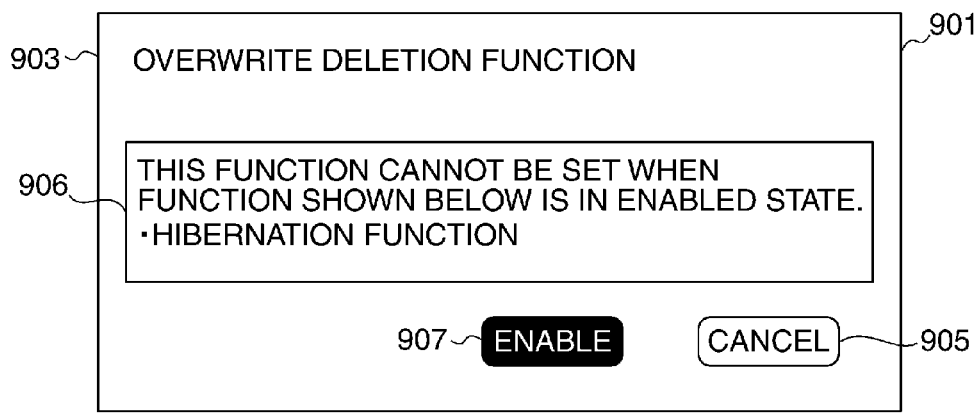
Figure 9C:
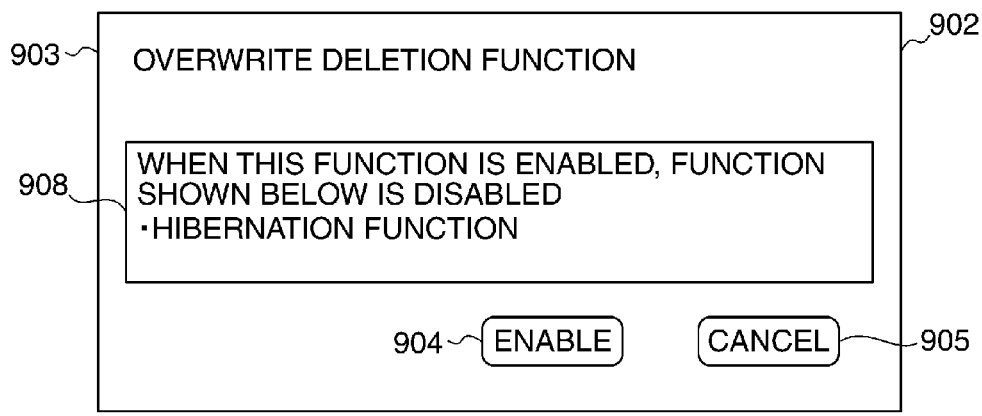

FIGS. 9A to 9C are views of screens displayed in the overwrite deletion function-setting screen display process in FIG. 8.

FIG. 9A shows a screen 900 displayed when both the overwrite deletion function and the hibernation function have been disabled.

The screen 900 displays an enable button 904 and a cancel button 905. When the enable button 904 is depressed by the user, the overwrite deletion function is enabled. This also applies to an enable button 904 shown on a screen 902, referred to hereinafter.

When the cancel button 905 is depressed by the user, nothing is set. This also applies to a cancel button 905 shown on screens 901 and 902, referred to hereinafter.

On the other hand, FIGS. 9B and 9C show the screens 901 and 902 displayed when the hibernation function has been enabled and at the same time the overwrite deletion function has been disabled.

FIG. 9B further displays a warning message 906. Further, an enable button 907 is displayed in a color different from the color of the enable button 904 (greyed out, for example).

The screen 901 is displayed on the image forming apparatus 1 that cannot set the overwrite deletion function unless the hibernation function is disabled.

The warning message 906 notifies the user that the overwrite deletion function cannot be enabled in the enabled state of the hibernation function. Further, to indicate for the user that the overwrite deletion function cannot be set to be enabled, the enable button 907 is displayed in a color different from the color of the enable button 904. Therefore, even if the user has operated the enable button 907, a request for enabling the overwrite deletion function is not notified.

Note that the enable button 907 may be changed not only in color but also in form. Further, the enable button 907 is not required to be displayed.

In FIG. 9C, a warning message 908 is displayed.

The screen 902 is displayed on the image forming apparatus 1 that disables the hibernation function when the overwrite deletion function is set.

Therefore, the warning message 908 notifies the user that the hibernation function is disabled, if the overwrite deletion function is enabled in the enabled state of the hibernation function.

Figure 10:
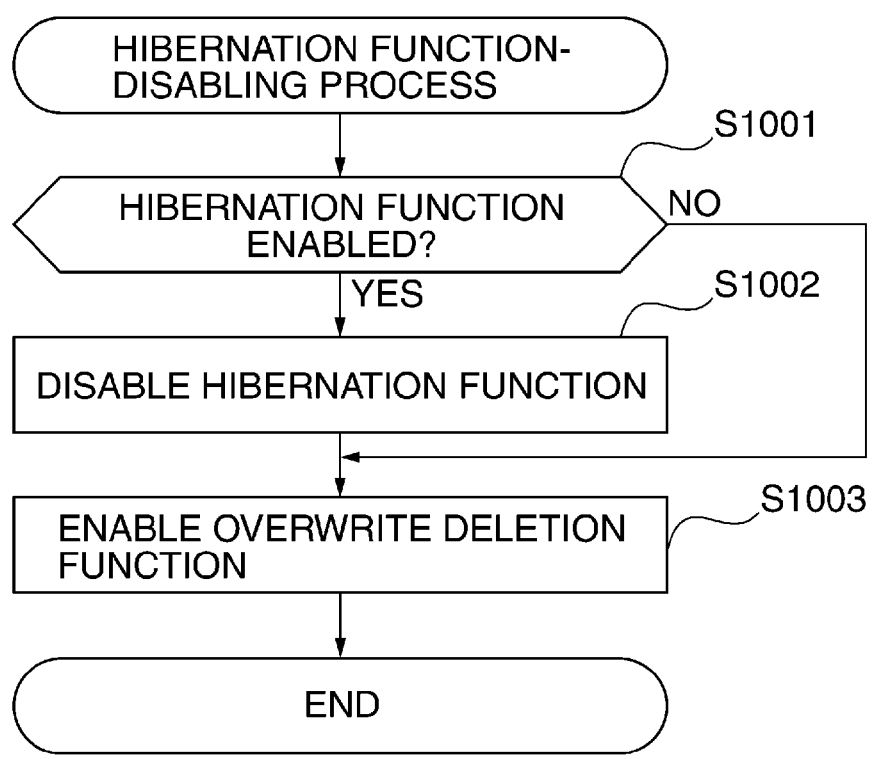
FIG. 10 is a flowchart of a hibernation function-disabling process executed by the CPU shown in FIG. 2.

FIG. 10 is a flowchart of a hibernation function-disabling process executed by the CPU 101 appearing in FIG. 2.

The process shown in FIG. 10 is executed in response to the request for enabling the overwrite deletion function, which is issued when the overwrite deletion function is set by the user.

First, it is determined whether or not the hibernation function has been enabled (step S1001). If it is determined in the step S1001 that the hibernation function has not been enabled (NO to the step S1001), the overwrite deletion function is enabled (step S1003), followed by terminating the present process.

On the other hand, if it is determined in the step S1001 that the hibernation function has been enabled (YES to the step S1001), the hibernation function is disabled, (step S1002), and the CPU 101 proceeds to the above-described step S1003.

Next, a second embodiment of the present invention will be described. In the second embodiment, a variation of the setting item list screen shown in FIG. 4 is used. Except different points described hereafter, the image forming apparatus as the information processing apparatus according to the second embodiment has the same hardware and software configurations. Therefore, corresponding components are denoted by the same reference numerals, and description thereof is omitted.

Figure 11A:
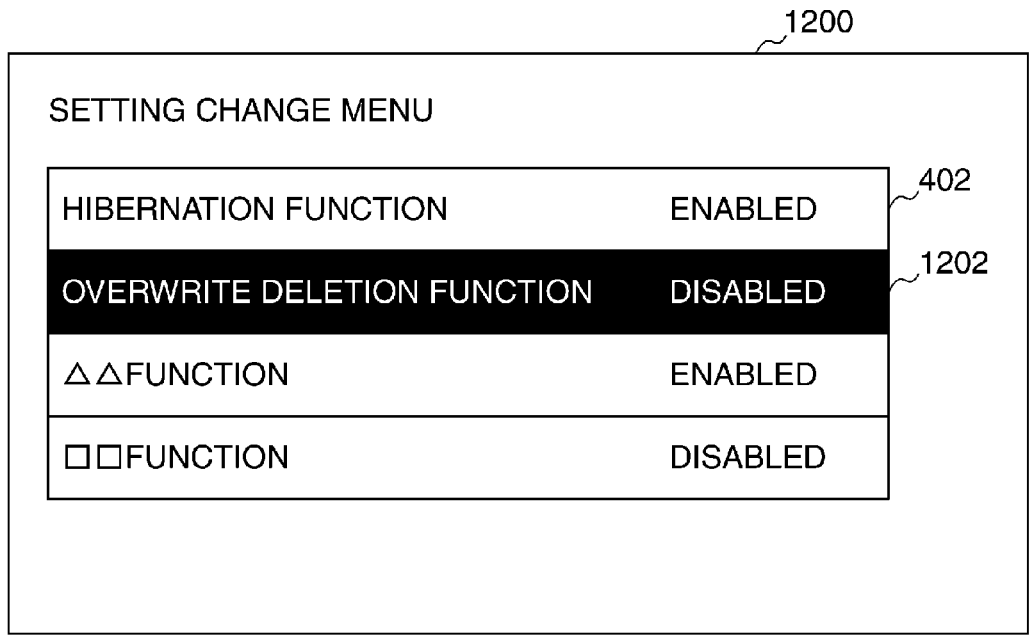
FIGS. 11A and 11B are views of setting item list screens displayed on a display section of an image forming apparatus as an information processing apparatus according to a second embodiment of the present invention.
Figure 11B:
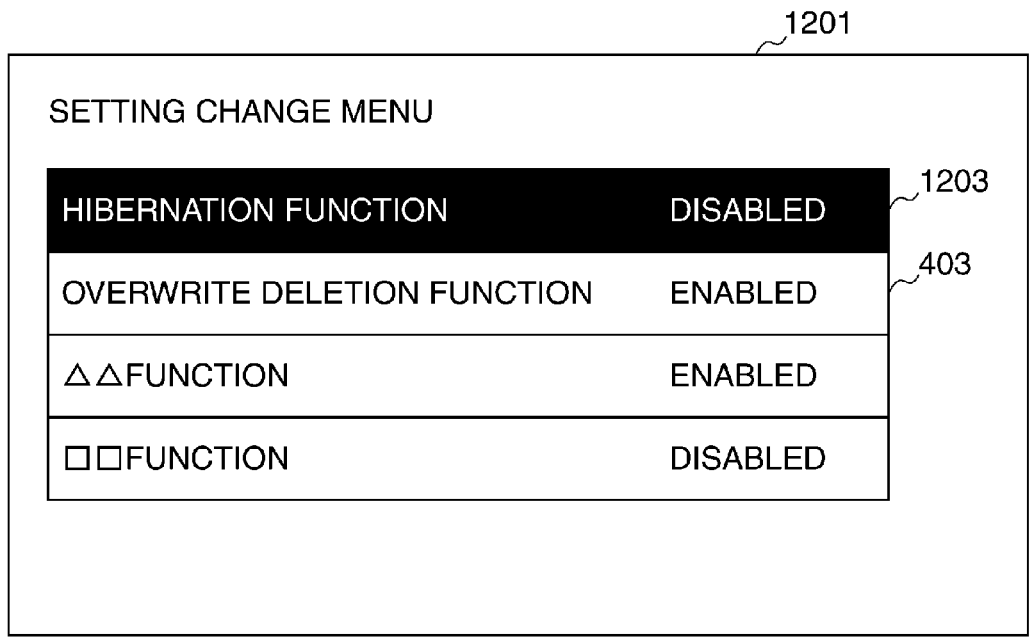

FIGS. 11A and 11B are views of setting item list screens displayed on the display section 108 shown in FIG. 2.

FIG. 11A shows a screen 1200 on which the user is inhibited from setting the overwrite deletion function.

The screen 1200 has a button 1202 displayed in a color different from the color of the other button, and is configured such that even if the button 1202 is depressed by the user, the overwrite deletion function-setting screen is not displayed.

FIG. 11B shows a screen 1201 on which the user is inhibited from setting the hibernation function.

The screen 1201 has a button 1203 displayed in a color different from the color of the other button, and is configured such that even if the button 1203 is depressed by the user, the hibernation function-setting screen is not displayed.

As described above, on each of the setting item list screens according to the second embodiment, when one of the hibernation function and the overwrite deletion function has been enabled, even if the other button on the screen is depressed, a request for shifting the screen to an associated setting screen is not notified and a shift to the setting screen is inhibited.

This makes it possible for the user to recognize that the settings on the screen are mutually exclusive, since it is impossible to shift to the setting screen.

FIG. 12 is a flowchart of a setting item list screen display process executed by the CPU 101 shown in FIG. 2.

Referring to FIG. 12, it is determined whether or not the overwrite deletion function has been enabled (step S1101). If it is determined in the step S1101 that the overwrite deletion function has been enabled (YES to the step S1101), the above-described screen 1201, which is an overwrite deletion function-enabled screen, is displayed (step S1102), followed by terminating the present process.

On the other hand, if it is determined in the step S1101 that the overwrite deletion function has not been enabled (NO to the step S1101), it is determined whether or not the hibernation function has been enabled (step S1103).

If it is determined in the step S1103 that the hibernation function has not been enabled (NO to the step S1103), a normal screen is displayed (step S1105), followed by terminating the present process. The normal screen has no button made different in color from the other button on the screen for inhibiting a shift to a setting screen, but has the same form as that of the FIG. 4 screen.

On the other hand, if it is determined in the step S1103 that the hibernation function has been enabled (YES to the step S1103), the above-described screen 1200, which is a hibernation function-enabled screen, is displayed (step S1104), followed by terminating the present process.

The steps S1102 and S1104 correspond to operations of a display control unit configured to control the display section 108 to explicitly indicate, when one of the overwrite deletion function and the hibernation function has been enabled, that the other function cannot be set to be enabled. In this case, the other function different from the function set to be enabled is inhibited from being set to be enabled.

In the above-described first embodiment, the steps S702 and S703 in FIG. 7, and the steps S1002 and S1003 in FIG. 10 corresponds to operations of a control unit. More specifically, in these steps, when an instruction for enabling one of the overwrite deletion function and the hibernation function is input, in a case where the other function has been set to be enabled, only one of the functions is set to be enabled. In this case, one function having been set to be enabled is set to be disabled, and the other function instructed to be enabled is set to be enabled.

As described heretofore, according to the present embodiment, when an instruction for enabling one of the overwrite deletion function and the hibernation function is input, in a case where the other function has been set to be enabled, only one of them is set to be enabled. As a consequence, e.g. when security is desired to be ensured, the overwrite deletion function is enabled and the hibernation function is disabled to thereby shift the image forming apparatus 1 to the power saving state where the hibernation function is not used. This also makes it possible to reduce the power consumption of the image forming apparatus. As described hereinabove, according to the present embodiment, it is possible to effectively use the overwrite deletion function and the hibernation function.

Although in the above-described embodiment, the description has been given of the image forming apparatus 1 by way of example, the present invention may be applied to personal computers, tablet terminals, portable terminals, and like other information processing apparatuses, which are equipped with the hibernation function and the overwrite deletion function.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2012-151365 filed Jul. 5, 2012, which is hereby incorporated by reference herein in its entirety.

What is claimed is:

1. An information processing apparatus that is equipped with an overwrite deletion function for overwriting data stored in a nonvolatile memory device, and a hibernation function for causing data stored in a volatile memory device to be stored in the nonvolatile memory device, comprising:
    a non-transitory memory device;
    a processor;
    an input unit configured to receive an instruction for enabling the overwrite deletion function or the hibernation function; and
    a control unit configured to perform a control, in a case where one of the overwrite deletion function and the hibernation function is enabled, such that the other function is disabled,
    wherein when said input unit receives the instruction for enabling one of the overwrite deletion function and the hibernation function and the other function has been set to be enabled, said control unit inhibits the one function from being set to be enabled, or sets the other function to be disabled and sets the one function to be enabled, and
    wherein the control unit is implemented at least in part by the processor executing at least one program recorded on the non-transitory memory device.

2. The information processing apparatus according to claim 1, further comprising:
    a display unit configured to display information to a user; and
        a display control unit configured to control said display unit to explicitly indicate, when one of the overwrite deletion function and the hibernation function has been enabled, that the other function cannot be set to be enabled, wherein the display control unit is implemented at least in part by the processor executing at least one program recorded on the non-transitory memory device.

3. The information processing apparatus according to claim 1, wherein in a case where the overwrite deletion function has been set to be enabled and the hibernation function has been set to be disabled, power consumption of the information processing apparatus is reduced without using the hibernation function.

4. An information processing apparatus that is equipped with an overwrite deletion function for overwriting data stored in a nonvolatile memory device, and a hibernation function for causing data stored in a volatile memory device to be stored in the nonvolatile memory device, comprising:

a non-transitory memory device;

a processor; and a control unit configured to perform a control, in a case where one of the overwrite deletion function and the hibernation function is enabled, such that the other function is disabled, wherein in a case where the hibernation function has been set to be enabled and the information processing apparatus is restarted using data stored in the nonvolatile memory device by the hibernation function, the data stored in the nonvolatile memory device by the hibernation function is deleted using the overwrite deletion function, and wherein the control unit is implemented at least in part by the processor executing at least one program recorded on the non-transitory memory device.

5. A method of controlling an information processing apparatus that is equipped with an overwrite deletion function for overwriting data stored in a nonvolatile memory device, and a hibernation function for causing data stored in a volatile memory device to be stored in the nonvolatile memory device, comprising:

receiving an instruction for enabling the overwrite deletion function or the hibernation function; and performing a control, in a case where one of the overwrite deletion function and the hibernation function is enabled, such that the other function is disabled, wherein a function corresponding to the received instruction is enabled, and wherein when the instruction for enabling one of the overwrite deletion function and the hibernation function is received and the other function has been set to be enabled, the one function is inhibited from being set to be enabled, or the other function is set to be disabled and the one function is set to be enabled.

6. A non-transitory computer-readable storage medium storing a computer-executable program for causing a computer to execute a method of controlling an information processing apparatus that is equipped with an overwrite deletion function for overwriting data stored in a nonvolatile memory device, and a hibernation function for causing data stored in a volatile memory device to be stored in the nonvolatile memory device, wherein the method comprises:

receiving an instruction for enabling the overwrite deletion function or the hibernation function; and performing a control, in a case where one of the overwrite deletion function and the hibernation function is enabled, such that the other function is disabled, wherein a function corresponding to the received instruction is enabled, and wherein when the instruction for enabling one of the overwrite deletion function and the hibernation function is received and the other function has been set to be enabled, the one function is inhibited from being set to be enabled, or the other function is set to be disabled and the one function is set to be enabled.

7. A method which is executed by an information processing apparatus that is equipped with an overwrite deletion function for overwriting data stored in a nonvolatile memory device, and a hibernation function for causing data stored in a volatile memory device to be stored in the nonvolatile memory device, the method comprising:

receiving an instruction for enabling the overwrite deletion function or the hibernation function; and performing a control, in a case where one of the overwrite deletion function and the hibernation function is being enabled, to make the other function disabled, wherein, in the performing the control, when the instruction for enabling one of the overwrite deletion function or the hibernation function is received and the other function is enabled, the one function is inhibited from being enabled, or the other function is disabled and the one function is enabled.

8. The method according to claim 7, further comprising displaying information, when one of the overwrite deletion function and the hibernation function is enabled, that indicates that the other function cannot be set to be enabled.

9. The method according to claim 7, further comprising displaying information, when one of the overwrite deletion function and the hibernation function is enabled, that indicates that the one of the overwrite deletion function and the hibernation function that is enabled will be disabled.

* * * * *